Oct. 21, 1947.    H. A. McMASTER    2,429,420
CONDUCTIVE COATING FOR GLASS AND METHOD OF APPLICATION
Filed Oct. 5, 1942
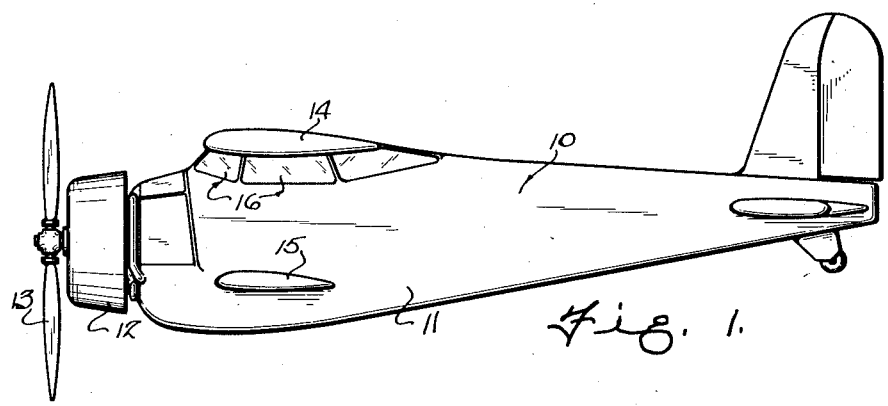
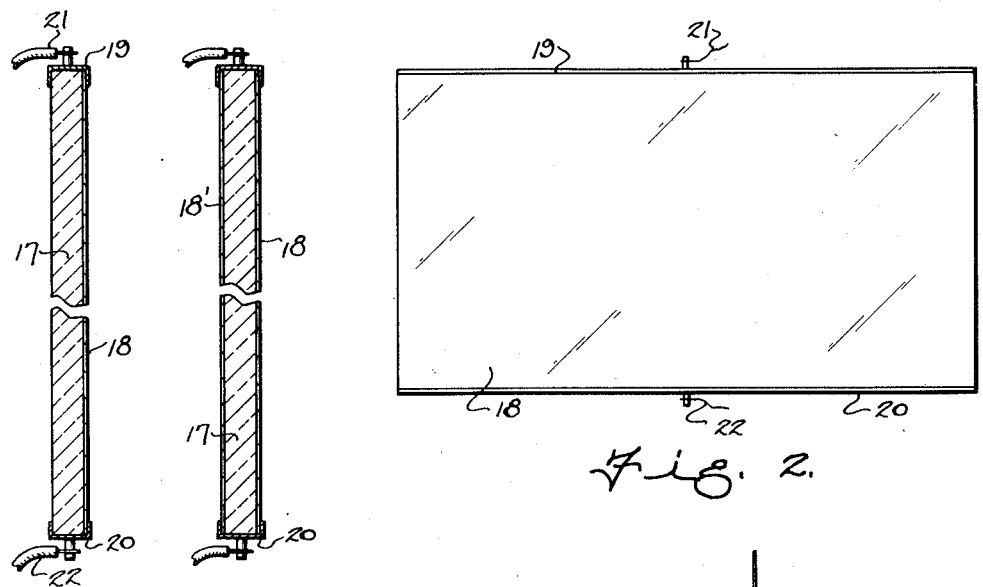
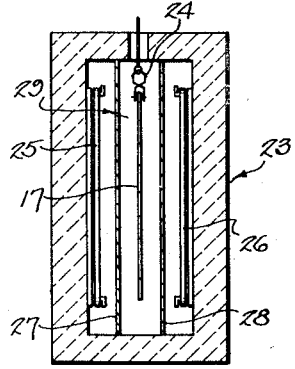
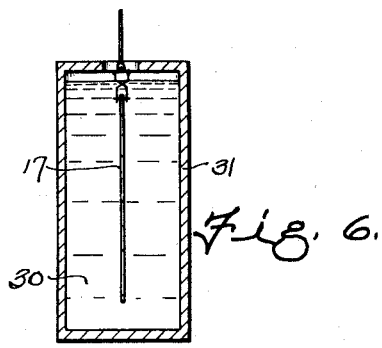
Inventor
HAROLD A. McMASTER
By
Frank Fraser
Attorney Patented Oct. 21, 1947

2,429,420

UNITED STATES PATENT OFFICE 2,429,420

CONDUCTIVE COATING FOR GLASS AND METHOD OF APPLICATION

Harold A. McMaster, Toledo, Ohio, assignor to Libbey-Owens-Ford Glass Company, Toledo, Ohio, a corporation of Ohio Application October 5, 1942, Serial No. 460,838

4 Claims. (Cl. 117—54)

The present invention relates to electrically conducting coatings for application to glass and other vitreous substances; to methods of applying such coatings; and to articles embodying the same.

It is an object of this invention to provide on glass or other electrically non-conductive surfaces thin transparent coatings or films possessing the property of electrical conductivity, which coatings are clear, hard and tenacious and of uniform thickness; which are in intimate contact with the glass or other surface; and which will retain these properties under adverse conditions.

An electrically conducting glass of the character herein provided may be employed for a variety of purposes such as, for example, in the making of burglar alarms, heating elements and electrical resistors. A special use is the application of the conducting glass for glazing the windshield and/or window openings in airplanes and other aircraft, although it may be advantageously employed for glazing openings wherever adequate clear vision is required under adverse weather conditions. Thus, the conducting glass can be used for efficiently de-icing windows of high altitude bombers in which interior icing of windows is a major problem.

In its broad aspect, my invention consists in the discovery that tin chlorides, including hydrated stannous chloride and hydrated stannic chloride, can be used to produce exceedingly thin transparent coatings or films on glass or other vitreous surfaces and that such coatings or films have good electrical conducting properties. I have further discovered that in order to obtain a clear transparent coating or film having the desired conducting properties, the tin chloride must be applied to the surface to be coated in the presence of a controlled amount of water. Thus, it was found that the presence of too little water while the film is being formed resulted in low conductivity of the film, whereas the presence of an excess amount of water caused fogging as well as thickness variations in the film. For instance, anhydrous stannic chloride vaporized onto a glass surface gives a very clear film but such film is non-conducting. However, during tests with dry salts it was observed that an excellent clear conducting film formed where the glass was exposed to both the dry stannic chloride vapors and the moist air. This observation indicated the possibility that a suitable transparent conducting film could be formed if a controlled amount of water could be made available while the film is being applied.

In my work with tin chlorides, I discovered that when hydrated stannous chloride is vaporized onto the surface of hot glass it forms a thin film having good conducting properties. This was accomplished by placing a small quantity of stannous chloride salt crystals on a sheet of glass and heating the glass to redness in a Bunsen flame. When this was done, the crystals vaporized and the vapors therefrom formed a conductive film on the glass. This film, however, was somewhat foggy and varied in thickness over the sheet so that it was not entirely satisfactory for glazing purposes. The fogging, I determined, was due to an excess amount of water available when the film was being formed, while the variation in thickness of the film was caused mainly by the method of application.

I then discovered that the fogging of the glass could be considerably reduced by producing a film with liquid stannic chloride vapors carried in a stream of carbon dioxide gas. In this method, a sheet of glass was first heated to redness and the stannic chloride vapors then directed upon the glass in a stream of carbon dioxide gas in the form of a plurality of small jets. By way of illustration, a 6 in. x 8 in. sample was coated in this manner and 80 volts A. C. current was applied to electrodes arranged along the 8 in. edges of the sample for 2 minutes after which time the glass had reached a temperature of 260° F. in the open air. While the residual fog and thickness variations in films made by this method are not as objectionable as those formed by the method above described employing hydrated stannous chloride vapors, such films are still not entirely satisfactory for glazing purposes. In this case, the fogging seemed to be due to the water of crystallization in the salts.

I also found that anhydrous stannic chloride dissolves in absolute alcohol without deposition, whereas if water alone is added to the stannic chloride undesirable fuming occurs and the liquid is unstable and hard to handle as well as failing to produce a satisfactory conducting coating. However, if the alcohol is first added to the stannic chloride and the water then added to this mixture, no fuming occurs and there is provided a stable liquid which can be sprayed onto glass to form a conducting coating. For example, I dissolved one part anhydrous stannic chloride by volume in one part absolute alcohol by volume and then added one part water by volume to this solution. When this mixture was sprayed on glass heated to 550 to 650° C. a clear conducting film was formed.

Further efforts to improve the uniformity of the film led to immersing the hot glass in various liquids. When stannic chloride alone was used, no film resulted since, as before, water was necessary. When small amounts of water were added directly to the stannic chloride the films were foggy and the liquid was highly volatile. The next step tried was adding organic liquids which would decompose giving water at a high temperature. I discovered that a satisfactory coating liquid could be produced by combining 1 part glacial acetic acid, 1 part absolute alcohol and 2 parts stannic chloride by volume and heating until the boiling point was between 120° C. and 130° C. Upon boiling of the mixture a controlled amount of water is liberated from the acetic acid and it is the presence of this controlled amount of water which results in the forming of a good conducting coating. Stannic chloride, when used as above described, will produce conducting films not only on glass but on a variety of vitreous substances such as glazed porcelain, unglazed porcelain, ceramic bodies, fused silica, etc.

In practicing this method, the glass was heated close to the softening point and then immersed in the above liquid. The glass was allowed to remain in the liquid for only a few seconds, whereupon it was removed and cooled in the open air. Of course, this cooling may be carried out in a suitable leer or oven if desired. If the chief constituent of the liquid is stannic chloride, which has a low specific heat and heat of vaporization, cracking of the glass will be minimized. The films produced were clear and of a uniform thickness. They were also very hard and tenacious and not harmed by washing with scouring powders which do not scratch glass or by buffing with rouge. The light transmission of a half wave-length thick film applied as described was found to be 92%, while the resistance was approximately 200 ohms between parallel electrodes spaced by a distance equal to their length. The conductivity of the film was found to increase with thickness. Since this dipping method was found to produce the most satisfactory coatings, one way in which such method may be carried out has been illustrated by way of example in the accompanying drawings, wherein:

Fig. 1 is a side elevation of one type of airplane in which conducting glass produced by the present invention may be used;

Fig. 2 is a plan view of a sheet of conducting glass provided by the invention;

Fig. 3 is a vertical transverse section through Fig. 2;

Fig. 4 is a vertical transverse section through a sheet of glass having conducting coatings applied to both sides thereof;

Fig. 5 is a sectional view illustrating one form apparatus which may be used for heating the glass sheet; and Fig. 6 is a sectional view illustrating the dipping of the heated sheet in the coating liquid.

With reference now to the drawings, there is shown in Fig. 1 an airplane 10 of the type having a fuselage 11 with a forwardly located engine 12 and propeller 13. The plane is also provided with upper and lower wings 14 and 15 and a cockpit having the transparent closures 16 which substantially completely enclose the pilot and enable him to have a wide sphere of vision. The transparent closures 16 include the windshield which is located in front of the pilot and the windows arranged along opposite sides of the plane. It will of course be appreciated that the airplane herein disclosed is simply one type of plane with which the present invention may be used and that the invention is adapted for use in aircraft of all kinds. In fact, the invention may be used in glazing any opening where adequate clear vision is required under adverse weather conditions such as, for example, in aircraft carriers and other naval vessels, airport control towers, lighthouses, etc.

In Figs. 2 and 3 is shown a transparent closure comprising a sheet or plate of transparent glass 17 provided upon one surface thereof with an electrical conductive coating 18 applied thereto in accordance with the present invention. Carried along the upper and lower edges of the glass sheet are metal channel members 19 and 20 constituting electrodes contacting the conducting coating 18 and having attached thereto the electric connections 21 and 22 respectively.

In Fig. 4 is illustrated a sheet or plate of glass 17 having the conducting coating 18 applied to one face thereof and a second conducting coating 18' applied to the opposite face thereof.

In applying the conducting coatings 18 and 18', the glass sheet 17 is first heated to approximately the point of softening of the glass and this may be accomplished as shown in Fig. 5, wherein the sheet is suspended within a furnace 23 by relatively small hooks or tongs 24 engaging the sheet adjacent its upper edge. The furnace 23 may be of any suitable type but is here shown as being heated by the electrical heating units 25 and 26 arranged along opposite side walls thereof. Disposed inwardly of the heating units are baffle plates 27 and 28 which define therebetween a heating chamber 29 within which the sheet is arranged. After the glass sheet has been properly heated, it is withdrawn from the furnace and immediately immersed in a bath of the coating liquid 30 contained in a container 31 (Fig. 6). As explained above, the heated glass sheet is immersed in the liquid for only a few seconds whereupon it is removed and cooled. Of course, if only one face of the glass sheet is to be coated as in Fig. 3 then only that face of the heated sheet is immersed in the coating liquid. This can be accomplished either by masking the opposite face or by bringing the glass sheet into contact with the liquid while supporting the sheet in a horizontal position. The coated glass sheets shown in Figs. 3 and 4 can either be used singly or they may be embodied in a multiple glazing unit comprising two or more sheets separated to provide an insulating space or spaces therebetween.

As above described, the bath of liquid 30 may consist of a mixture of glacial acetic acid, absolute alcohol and stannic chloride. However, another liquid found to produce satisfactory conducting coatings consists of anhydrous stannic chloride containing an excess of chlorine dissolved therein and alcohol. Alcohol alone tends to crystallize with the stannic chloride but if chlorine is present a suitable liquid can be made upon boiling the solution. By way of illustration, I prepared a satisfactory liquid consisting of one part anhydrous stannic chloride containing chlorine dissolved therein and one part alcohol. The solution was boiled and the water content of the chlorinated alcohol gave a controlled amount of water in the liquid.

I claim:

1. The method of producing an electrically conducting coating on vitreous substances, which comprises treating the vitreous substance by first heating the same and then dipping it while hot in a liquid including anhydrous stannic chloride containing chlorine dissolved therein and alcohol.

2. A coating composition capable of acting on a vitreous substance to form an electrically conducting film thereon, comprising anhydrous stannic chloride containing an excess of chlorine dissolved therein and alcohol.

3. A windshield comprising, a pane of glass, a clear transparent electrically conducting coating consisting substantially of tin oxide having a thickness of the order of a half wave length of light on and tenaciously adherent to said pane, and a pair of electrodes arranged along opposite edges of said windshield and having electrical contact with the coating on the pane.

4. The method of producing a transparent electrically conducting coating on a surface of a vitreous substance, which comprises treating said surface by exposing the same while hot to contact with a liquid including stannic chloride containing chlorine dissolved therein and alcohol.

HAROLD A. McMASTER.

REFERENCES CITED

The following references are of record in the file of this patent:

UNITED STATES PATENTS

| Number | Name | Date |
| --- | --- | --- |
| 597,806 | Marangolo | Jan. 25, 1898 |
| 1,588,510 | Wear | Aug. 25, 1923 |
| 1,644,798 | Tillyer | Oct. 11, 1927 |
| 1,941,438 | Kiefer | Dec. 26, 1933 |
| 1,964,322 | Hyde | June 26, 1934 |
| 2,021,661 | Kisfaludy | Nov. 19, 1935 |
| 2,026,086 | Farncomb | Dec. 31, 1935 |
| 2,118,795 | Littleton | May 24, 1938 |
| 2,281,474 | Cartwright | Apr. 28, 1942 |
| 2,303,871 | Walker | Dec. 1, 1942 |

FOREIGN PATENTS

| Number | Country | Date |
| --- | --- | --- |
| 539,621 | Great Britain | Sept. 18, 1941 |